Aug. 9, 1932. L. L. LORD 1,871,219
EXPANSION JOINT AND METHOD OF CONSTRUCTING THE SAME
Filed Dec. 30, 1929
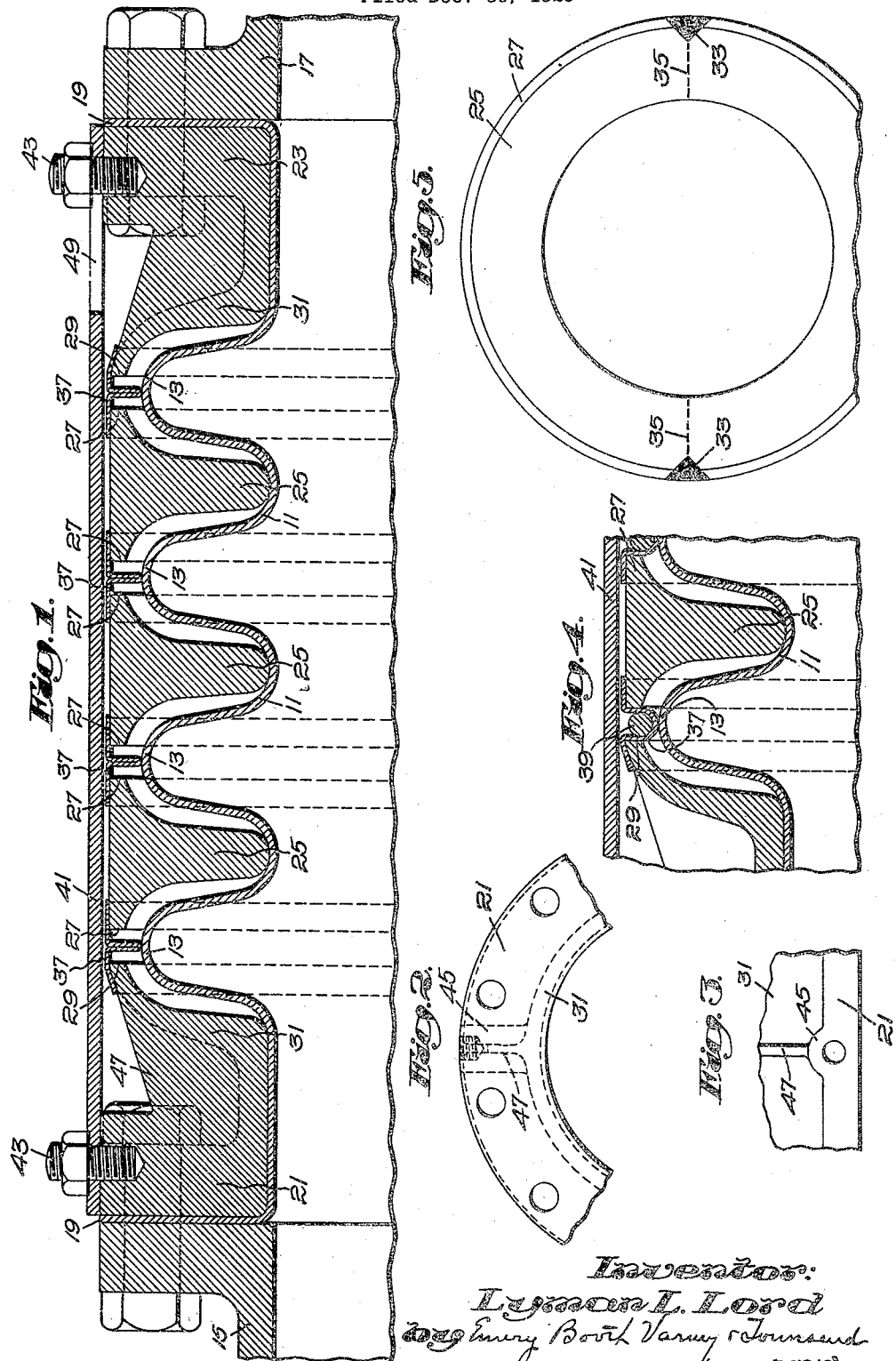

Patented Aug. 9, 1932

1,871,219

UNITED STATES PATENT OFFICE

LYMAN L. LORD, OF BOSTON, MASSACHUSETTS, ASSIGNOR TO E. B. BADGER & SONS COMPANY, OF BOSTON, MASSACHUSETTS, A CORPORATION OF MASSACHUSETTS

EXPANSION JOINT AND METHOD OF CONSTRUCTING THE SAME

Application filed December 30, 1929. Serial No. 417,342.

This invention relates to expansion joints and methods of constructing the same, and more particularly to expansion joints provided with a circumferentially corrugated metallic sleeve and externally arranged reinforcing devices.

One object of the invention is to provide an expansion joint of simple, compact and inexpensive construction suitably reinforced to meet the conditions of expansion and contraction. A further object of the invention is to provide means for protecting the spaces between the reinforcing members and the corrugations of the joints against the entrance of dust, grit and other foreign matter. Another object is to provide means for limiting both the expansion and contraction of the joint and for maintaining a proper alignment of the joint with the opposed, separated sections of the pipe line between which the joint is inserted. Another object is to provide means for holding the reinforcing members in separated position and preventing collapse of the joint during shipment and prior to installation. A further object of the invention is to provide a joint of the character referred to presenting a substantially continuous casing well adapted to receive a covering of pipe insulating material or the like.

These and other objects of the invention will be best understood by reference to the following description when taken in connection with the accompanying illustration of one specific embodiment thereof, while its scope will be more particularly pointed out in the appended claims.

In the drawing:

Fig. 1 is a longitudinal, sectional elevation, partly broken away, showing the construction of the principal members comprising the joint;

Fig. 2 is a detail showing a portion of the end ring flange in end elevation;

Fig. 3 is a plan view of the end ring flange shown in Fig. 2, partly broken away;

Fig. 4 is a sectional detail showing the method of inserting the wire separators in preparing the joint for shipment; and Fig. 5 is a side elevation of one of the reinforcing rings showing the method of manufacture.

Referring to the drawing and to the illustrative form of the invention there shown, the expansion member of the joint is in the form of a continuous metallic tubular conduit or sleeve 11 provided with one or more corrugations or circumferential enlargements 13, the sleeve being constructed of any suitable metal, such, by way of example, as copper, so as to provide a member capable of repeated longitudinal expansions and contractions without deterioration on movement in the direction of its axial length. The joint may be formed with any number of such corrugations, according to the service to which it is to be applied, but herein, for illustration, it is shown as provided with four circumferential ridges having three intermediate grooves or depressions.

The end portions of the expansion member may be secured in any desired manner to the adjacent but separated and opposed sections 15 and 17 of the pipe line to form a fluid tight conduit, but herein a common method is illustrated which comprises the formation of flanges 19 on the end of the sleeve and clamping them between the flanged ends of the pipe sections and the flanged ends 21 and 23 of the end reinforcing rings hereinafter described.

The illustrative form of expansion joint is provided with external circumferential reinforcing members in the form of appropriately shaped rings 25, each ring engaging the outer walls of the sleeve and closely fitting the hollow between the adjoining corrugations 13. The side walls of each reinforcing ring are shaped to provide and limiting walls 27 cooperatively related to each other, the position of the limiting walls being such that they approach and recede each from the other with the contraction and expansion of the joint. The spacing of the limiting walls is such that, during contraction of the joint, when any one of the corrugations has flexed to the maximum extent desired, the limiting walls contact directly or indirectly with each other and prevent further contraction of the joint at that point. This requires further contraction of the joint to be provided by a further flexing of the remaining corrugations. The contraction of each outer corrugation is limited by contact, direct or indirect, between the outer limiting walls 27 and opposed limiting walls 29 presented by the end rings 31 carried by and forming a part of the end flanges 21 and 23.

When contact has been made between each set of abutting walls a rigid, non-compressible structure results, preventing further contraction of the joint. The reinforcing devices, accordingly, limit the contracting movement of the sleeve and also tend to equalize the flexing at the several corrugations thereof.

In the illustrative form of the invention, the several rings 25 which are positioned in the corrugations, as well as the end rings 31, may be of cast iron or other suitable metal and are preferably cast initially in the form of a complete annulus, the shape of which is shown in Fig. 5, the annulus being formed with diametrically opposite V-shaped recesses 33 in its periphery. Each annulus is then split along a diametrical line 35 passing through the apex of each V-shaped recess thereby forming two separate halves or sections. The separate sections are then applied to the exterior of the tubular sleeve, each in its proper position to embrace the sleeve and are assembled thereon in the form of a complete ring with the split halves in mating relation, after which they are integrally joined as by welding, the welding material being caused to fill in the V-shaped recess, as represented in Fig. 5.

This method of manufacture not only simplifies the manufacturing process, since it is unnecessary to drill or tap the two halves for the reception of threaded clamping bolts or to perform other machine work on the two halves necessary for clamping them accurately together, but, in the finished ring, provides a smooth, unbroken periphery uninterrupted by projecting lugs, bolts or the like. This both adds to the finished appearance of the joint and decreases the weight and bulk thereof.

To provide means for protecting the spaces between the adjacent reinforcing rings against the admission of dirt, grit or other extraneous material or objects, individual protectors 37 are provided for each such gap or space. These are preferably of annular form and of relatively soft sheet metal. They may comprise a complete annulus or may consist of a strip of metal bent into annular form with its ends disconnected so that it can be readily applied to the joint or easily removed for purposes of repair and inspection. Each annular protector (as shown in Figs. 1 and 4) is provided with lateral flanges resting on and having sliding engagement with the outer peripheral walls of adjacent reinforcing rings. Each protector, when initially applied to the joint, is formed to provide a portion having a U-shaped cross section between the lateral flanges, presenting an inturned annular portion which enters into the gap between the limiting walls of the reinforcing rings and substantially fills the space between them. This position is illustrated in Fig. 4 of the drawing, where it will be seen that the inturned annular portion of each protector tends to maintain the reinforcing members in a separated relationship.

For the purposes of shipment and to hold the joint expanded and prevent its collapse until it is installed or ready to be installed, there is then inserted in the grooves provided by the U-shaped, cross-sectional portion of the protector a filler or separating member, comprising the wire 39, of a diameter sufficient to substantially fill the groove and maintain the reinforcing rings separated. The several fillers may be formed from a straight piece of wire bent into a ring like formation so that each wire can be readily removed when the joint is ready for installation.

When the joint is installed, the separating wires 39 are removed and the subsequent contractions of the joint under continued usage soon compress and flatten the walls of the entering portion of the protector so that the latter assumes a T-shaped cross sectional shape, with a flat, double-walled, inturned, annular rib positioned between the limiting walls of the adjoining reinforcing rings, the contraction of the joint being limited by indirect contact of the limiting walls through engagement with the inturned rib.

On subsequent contractions and expansions the flanged walls of the several protectors rest loosely on the peripheral walls of the reinforcing rings, being maintained during movements of the reinforcing rings in protecting relation to and to cover the intervening spaces by the inturned annular rib.

Protecting and enclosing the corrugated member and reinforcing rings there is also provided a cylindrical sleeve 41 which is formed to fit about and bear at each end upon the cylindrical periphery of the flanges 21 and 23 of the two end rings so that it presents a substantially unbroken, continuous, cylindrical casing extending from one end flange to the other, serving further to protect the joint against the entrance of dust, grit and extraneous objects, giving a finished appearance to the joint and providing a surface to which there is readily applicable, if desired, a pipe covering of insulating material.

Herein, to adapt the protecting sleeve to the expansions and contractions of the joint, it is provided with sliding engagement with the cylindrical end flanges and serves both to limit the expansion of the joint and to maintain an effective alignment of the joint at all times with the opposite separated sections of the pipe line. For this purpose the joint might have sliding contact with both opposed cylindrical flanges, but herein it is rigidly fixed to the flange 21 by one or more bolts 43, the latter entering a boss 45 (Figs. 2 and 3) formed in the flange and connected with the end ring 31 by the rib 47. The sliding movement of the sleeve on the opposite cylindrical end flange 23 and the expansion of the joint is limited by a similar bolt 43 similarly positioned in the opposite flange 23 but passing through a longitudinal slot 49 in the sleeve. The slot is so dimensioned as to permit the desired movement and expansion of the joint but to prevent the expansion thereof from exceeding a certain predetermined maximum.

Since the sleeve bears upon the opposite circumferential end flanges of the joint, it acts effectively to guide the joint in its expansion and contraction and to maintain the required alignment thereof, providing at the same time a continuous cylindrical casing for the entire joint.

The protecting sleeve may be employed either with or without the individual protectors 37 and the latter may be employed with or without the protecting sleeve, or both may be employed in the same joint together. When the protecting sleeve is employed, the joint may be locked in position to prevent its collapse during shipment by clamping the sleeve 41 rigidly to the end flange 23 by means of the bolt 43, the latter being loosened after the joint has been installed to permit the necessary movement of the sleeve during the expansion and contraction of the joint. In installing the joint where both the separating wires and the cylindrical sleeve are employed, the latter is removed before installation and the rings then taken off, after which the sleeve is replaced.

While I have herein shown and described for the purpose of illustration one specific embodiment of the invention, it is to be understood that extensive deviations and changes may be made in the form, arrangement, construction and relation of the parts as disclosed, all without departing from the spirit of the invention.

I claim:

1. In an expansion joint, the combination with a corrugated tubular expansion member, of a pair of relatively separable external reinforcing members engaging the expansion member, and a protector covering the space between adjacent reinforcing members and engaging the outer peripheral walls of said members, said protector having a portion entering the space between the walls of said members.

2. In an expansion joint, the combination with a corrugated tubular expansion member, of a pair of relatively separable external reinforcing members engaging the expansion member, and means for excluding the entrance of grit, dust and the like between said reinforcing members comprising a protector covering the space between adjacent reinforcing members, said protector having sliding engagement with the outer peripheral walls of adjacent members and having an inturned rib entering the space between the walls of said members.

3. In an expansion joint, the combination with a corrugated tubular expansion member, of a pair of relatively separable external reinforcing members engaging the expansion member, and a sheet metal protector of T-shaped cross section covering the space between said members, said protector having its lateral flanges in sliding engagement with the outer peripheral walls of said adjacent members and its inturned rib portion entering the space between the same.

4. In an expansion joint, the combination with a corrugated tubular expansion member, of a pair of relatively separable external reinforcing members engaging the expansion member, and a sheet metal protector having flanged walls engaging the outer peripheral walls of the adjacent reinforcing members and an intermediate portion of U-shaped cross section entering the space between said members and adapted to be compressed into flattened form on the contraction of the joint.

5. In an expansion joint, the combination with a corrugated tubular expansion member, of a pair of relatively separable external reinforcing members engaging the expansion member, a sheet metal protector having flanged walls engaging the outer peripheral walls of adjacent reinforcing members and an intermediate portion of U-shaped cross section entering the space between said members, and a filler positioned in the annular groove formed by said protector to hold the reinforcing members separated during shipment.

6. In an expansion joint, the combination with a corrugated tubular expansion member, of a pair of relatively separable external reinforcing members engaging the expansion member, a sheet metal protector having flanged walls engaging the outer peripheral walls of adjacent reinforcing members and an intermediate portion of U-shaped cross section entering the space between said members, and a filler comprising a ring shaped wire positioned in the annular groove formed by said protector to hold the reinforcing members separated during shipment.

7. In an expansion joint, the combination with a corrugated tubular expansion member, of a pair of relatively separable external reinforcing members engaging the expansion member, and an externally applied separating member filling the space between the reinforcing members.

8. In an expansion joint, the combination with a corrugated tubular expansion member, of a pair of relatively separable external reinforcing members engaging the expansion member, and an externally applied separating member comprising a ring shaped wire filling the space between the reinforcing members.

9. An expansion joint having a corrugated tubular expansion member provided with external reinforcing means comprising opposite annular end members having cylindrical flanged ends adapted to be rigidly secured to flanges of opposed separated sections of a pipe line and one or more intermediate annular reinforcing members, said members being adapted to approach and recede with the contraction and expansion of the joint and to limit the contraction thereof, a cylindrical sleeve enclosing said corrugated member and reinforcing members forming a protective casing therefor and presenting for said joint a substantially unbroken, cylindrical, outer surface, said sleeve being mounted on the cylindrical flanged ends of said reinforcing members and forming an aligning guide therefor to maintain the joint in alignment with said adjacent pipe sections, and means acting through said sleeve for limiting the movement of said end members to limit the expansion of the joint.

10. An expansion joint having a corrugated tubular expansion member with external reinforcing means, including end members adapted when the joint is installed to be rigidly secured to the tubular expansion member and the opposed separated sections of a pipe line, and a continuous protecting and aligning sleeve enclosing said tubular member and said end members and mounted for sliding engagement with one of said end members to form an aligning guide therefor to maintain the joint in alignment with adjacent pipe sections.

11. An expansion joint having a corrugated tubular expansion member provided with external reinforcing means comprising annular members adapted to approach and recede on contraction and expansion of the joint and to limit the contraction thereof, said joint presenting cylindrical end members secured to the expansion member, a cylindrical sleeve enclosing the corrugated member, reinforcing means and cylindrical end members and having telescopic sliding engagement with one of said end members to maintain the alignment of said joint with adjacent pipe sections, and means acting through the sleeve to limit the expansion of the joint.

In testimony whereof, I have signed my name to this specification.

LYMAN L. LORD.